3,575,934
HIGH MOLECULAR WEIGHT AROMATIC POLYAMIDES FROM DIAMINES CONTAINING THE BENZOTRIAZOLE NUCLEUS
Friedrich-Karl Rosendahl, Leverkusen, Heinrich Gold, Cologne-Stammheim, and Otto Bayer, Burscheid, Germany, assignors to Farbenfabriken Bayer Aktiengesellschaft, Leverkusen, Germany
No Drawing. Filed Apr. 15, 1968, Ser. No. 721,176
Claims priority, application Germany, Apr. 24, 1967, F 52,227
Int. Cl. C08g 20/20
U.S. Cl. 260—78                            2 Claims

ABSTRACT OF THE DISCLOSURE

The invention relates to high molecular weight aromatic polyamides having high melting points and being soluble in polar organic solvents, having recurring structural units containing N-2-phenylbenzotriazole ring systems, and to a process for their production by condensation of aromatic dicarboxylic acid dihalides with aromatic diamines containing said N-2-phenylbenzotriazole ring systems.

High molecular weight aromatic polyamides

The invention relates to high molecular weight aromatic polyamides of high melting point which contain benzotriazole groups and to a process for their preparation.

Aromatic polyamides containing the following structural unit:

$$[-\overset{H}{\underset{|}{N}}-Ar_1-\overset{H}{\underset{|}{N}}-\overset{O}{\underset{\|}{C}}-Ar_2-\overset{O}{\underset{\|}{C}}-]_n$$

and processes for their preparation are already known. In this formula, $Ar_1$ and $Ar_2$ which may be the same or different represent substituted or unsubstituted divalent aromatic structures in which the bonds which link them to the main chain are in the meta- or para-position to each other. The aromatic nuclei can also be substituted by alkyl, lower alkoxy, halogen, alkylsulfonyl and/or other groups which do not form a polyamide during the polycondensation.

Such polyamides cannot be prepared by the usual process employed for aliphatic polyamides, which consists of thermal polycondensation of diamines and dicarboxylic acids, because the melting points of aromatic polyamides which have sufficiently high molecular weights to enable them to be used for moulded articles are so high that decomposition takes place. Interfacial condensation or the polycondensation of dicarboxylic acid halides with diamines in highly polar solvents, if necessary in the presence of acid binding substances, must therefore be employed for the preparation of these polymers.

It is an object of this invention to provide polyamides containing recurring structural units of the formula

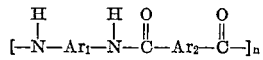

wherein $Ar_1$ represents a divalent aromatic radical containing at least once a N-2-phenylbenzotriazole ring system, $Ar_2$ represents a divalent aromatic radical and $n$ denotes an integer from 5 to 500.

It is another object of this invention to provide a process for the production of high molecular weight aromatic polyamides, which comprises polycondensing aromatic dicarboxylic acid halides with aromatic diamines containing at least once a N-2-phenylbenzotriazole ring system, said polycondensing being carried out in polar organic solvents at temperatures between —30 and +250° C.

In the formula as given above $Ar_1$ is preferably one of the following bivalent radicals:

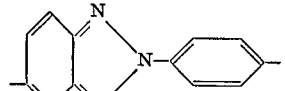

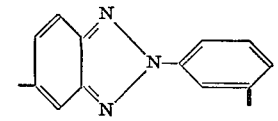

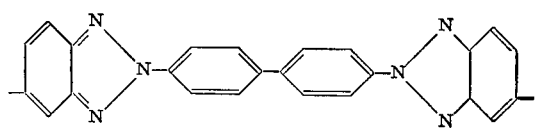

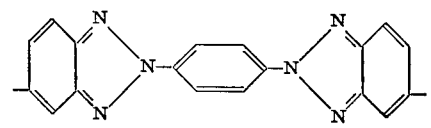

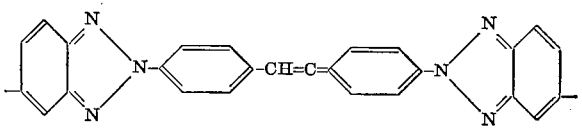

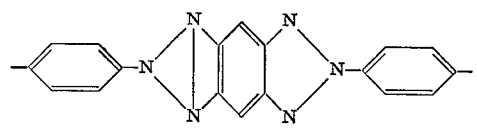

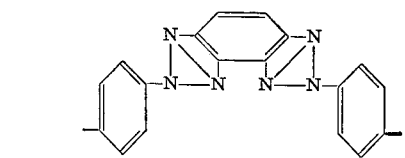

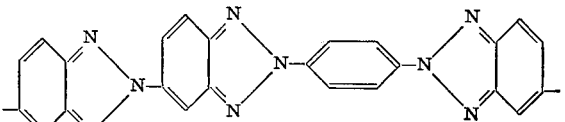

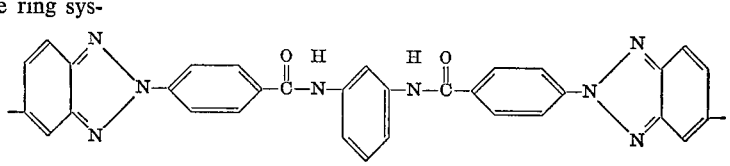

Ar₂ is preferably one of the following divalent aromatic radicals:

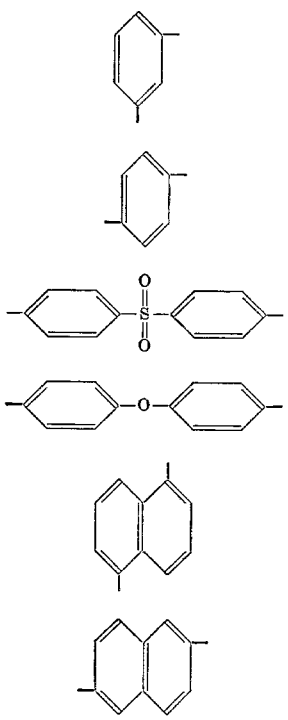

The polyamides prepared according to the invention containing the N-2-phenyl-benzotriazole system as an essential constituent of the polymer chain are notable for their exceptionally high melting points. Whereas, for example, the polyamide of m-phenylenediamine and isophthalic acid melts at 430° C., the decomposition temperatures of the new polyamides are about 500° C. or higher.

Organic compounds which have such high melting or decomposition temperatures are normally no longer soluble in organic solvents. It was therefore unexpected to find that solutions containing more than 20% of the new high molecular weight polyamides in highly polar solvents could be prepared, if necessary in the presence of a solubilising agent.

Apart from this excellent thermostability and solubility in polar solvents, the new polyamides show a high absorption in the ultraviolet region of the spectrum. The presence of the N-2-phenyl-benzotriazole system in the macromolecule causes a solution, for example, of the polyamide with the following structure unit:

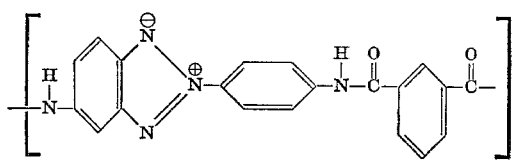

to absorb at $27.5 \times 10^3$ cm.$^{-1}$ ($\epsilon_{max}=47{,}000$) and at $26.1 \times 10^3$ cm.$^{-1}$ (shoulder).

The diamines, containing benzotriazole groups, used for the process may also be of the type in which the aromatic benz and phenyl radicals are substituted by alkyl, lower alkoxy, halogen, alkylsulfonyl, nitro or lower alkoxycarbonyl groups.

The following are examples of diamines which can be used:

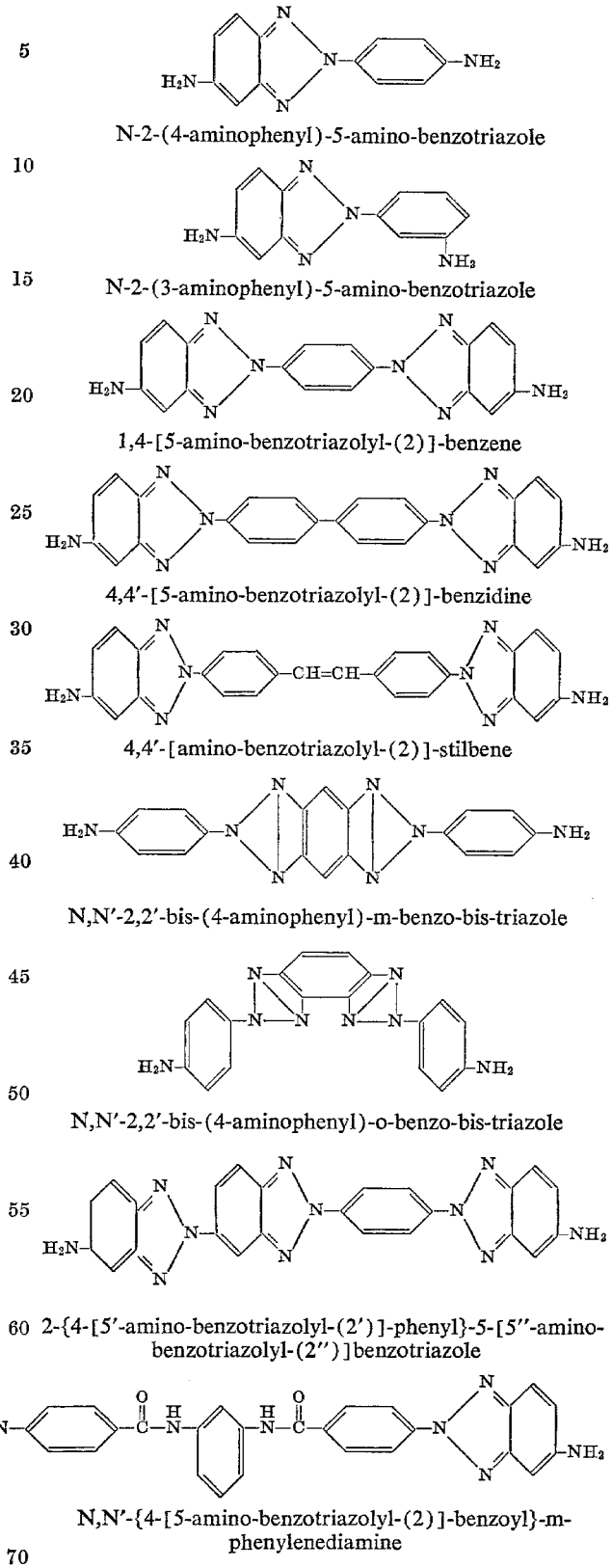

N-2-(4-aminophenyl)-5-amino-benzotriazole

N-2-(3-aminophenyl)-5-amino-benzotriazole 1,4-[5-amino-benzotriazolyl-(2)]-benzene 4,4'-[5-amino-benzotriazolyl-(2)]-benzidine 4,4'-[amino-benzotriazolyl-(2)]-stilbene N,N'-2,2'-bis-(4-aminophenyl)-m-benzo-bis-triazole N,N'-2,2'-bis-(4-aminophenyl)-o-benzo-bis-triazole 2-{4-[5'-amino-benzotriazolyl-(2')]-phenyl}-5-[5''-amino-benzotriazolyl-(2'')]benzotriazole N,N'-{4-[5-amino-benzotriazolyl-(2)]-benzoyl}-m-phenylenediamine The method of preparation of these diamines is known per se. Diazotised meta- or para-nitroanilines are first coupled with aromatic 1,3-diamines which are capable of coupling. The ortho-amino-azo dyes obtained from this reaction are then oxidised to benzotriazoles, and the aromatic diamines are obtained after hydrogenation of the nitro groups to amino groups.

The following are given as examples of dicarboxylic acid halides which are suitable for use in the preparation of the new polymers: naphthalene-1,5-dicarboxylic acid chloride; naphthalene-2,6-dicarboxylic acid chloride; diphenyl - 4,4' - dicarboxylic acid chloride; diphenylsulfone-4,4'-dicarboxylic acid chloride; diphenylether-4,4'-dicarboxylic acid chloride and preferably isophthalic acid dichloride and terephthalic acid dichloride.

The diamines given can be used alone or mixed with other aromatic diamines. The polyamides prepared according to the invention can by this means be adjusted to any desired absorption capacity in the ultraviolet region. The following are given as examples of aromatic diamines which can be used in addition to the diamines which contain N-2-phenyl-benzotriazol ring system: m-phenylenediamine and m-phenylenediamines substituted by lower alkyl groups; p-phenylenediamine; 4,4' - diaminodiphenylether; 4,4' - diaminodiphenylsulfone; 4,4' - diaminodiphenyl; 1,4 - di-(p-aminophenoxy)-benzene; 4,4' - di(p-aminophenoxy)-diphenylpropane - 2,2; 1,4 - bis - (2-chloro - 4 - aminophenoxy)-benzene and other mono- or polynuclear aromatic diamines.

The molecular weight of the polyamides can be regulated as desired by the addition of small quantities of monofunctional aromatic amines, such as aniline, or aromatic carboxylic acid derivatives, such as benzoyl chloride.

Polar solvents which have been found to be especially suitable for the condensation of the dicarboxylic acid chlorides with the diamines are N-alkylated pyrrolidones, such as N-methylpyrrolidone, and N-dialkylsubstituted amides of acetic acid and higher carboxylic acids, e.g. dimethylacetamide. One great advantage of these solvents is that no special acid acceptors, such as tertiary amines, have to be added in order to obtain high molecular weights, whereas if other polar solvents, such as tetramethylenesulfone, are used the presence of acid acceptors is necessary. Solubilising agents generally have to be added to the above mentioned solvents, in the form of alkali metal or alkaline earth metal hydroxides, chlorides or bromides, if precipitation of the polyamide is to be avoided. The polyamides can be isolated in solid form by pouring them into water or other solvents which are not capable of dissolving the reaction product.

The polyamides according to the invention can also be prepared by the process of interfacial condensation.

According to a preferred embodiment, the new polyamides are synthesised as follows: The diamine dissolved in a polar solvent is reacted at temperatures between −30 and +100° C., preferably between −15 and +30° C., in the presence of 1 to 10% (based on the quantity of solvent) of a solubilising substance, with the dicarboxylic acid halide. The dicarboxylic acid halide is added, either in solution or in solid form, and as far as possible is equivalent quantities, either all at once or in smaller portion to the polyamide with cooling. The reverse process, the addition of the diamine to the acid chloride, will also succeed but is not advisable owing to the risk of side reactions. The quantity of solvent is so chosen that the concentration of the polyamide is between 5 and 30% and preferable between 12 and 25%. The polyamides can be isolated very easily from this solution by spinning them directly into filaments by the wet spinning process, the filaments so produced are very easily freed from salts and the solvent by extraction with water owing to their favourable surface/volume ratio. These filaments may either be taken directly to further processing stages or, as in the cases of polyamides precipitated in other ways, be worked up into solutions which in turn can be shaped into filaments or films by many different processes.

Films and fibres of these new polyamides have melting or decomposition temperatures above 250° C. As is shown in some examples, the decomposition temperatures can also lie above 500° C.

The relative solution viscosities $\eta_{rel}$ of the polyamides can be determined in N-methylpyrrolidone which contains 5% of lithium chloride and 10 g. of polyamide per litre at 25° C.

The inherent viscosities $\eta_{inh}$ as given in the examples are reckoned from the relative solution viscosities measured according to the formula $$\eta_{inh} = \frac{\ln \eta_{rel}}{c}$$

To determine the absorption capacity at $$\bar{\nu} = 25 \times 10^3 \times cm.^{-1}$$

0.355 mg. of polyamide and 50 mg. of lithium chloride are dissolved together in 100 ml. of dimethylacetamide and the measurement of the absorbance A is carried out in a layer of thickness 1 cm. with a two beam UV-spectrophotometer type Unicam SP-700. Absorbance A as measured by spectrophotometers. Absorbance is defined in Theory and Applications of Ultraviolet Spectroscopy by Jaffe and Orchin (John Wiley and Sons, New York 1962) pp. 8–10;

where $$A = abc = \log I_0/I$$

where
$I$=intensity of light transmitted
$I_0$=intensity of incident light
$a$=absortivity
$b$=thickness of layer (cm.)
$c$=concentration.

This concentration used for the measurement corresponds to a $10^{-5}$ molar solution, based on the fundamental unit of the polyamide of the N-2-(4-aminophenyl)-5-aminobenzotriazole and isophthalic or terephthalic acid. Polyamides which have a different constitution can therefore only be compared in their absorption capacity based on the quantity of subtance but not on the molar concentration.

The following examples are to further illustrate the invention without limiting it.

EXAMPLE 1

7.55 g. of dry lithium chloride are dissolved in 302 g. of dry dimtheylacetamide at 100° C. in a reaction vessel equipped with stirrer blades and an internal thermometer. After cooling to room temperature, 33.76 g. of N-2-(4-aminophenyl) - 5 - aminobenzotriazole are added until a clear solution has formed, and 30.46 g. of isophthaloyl chloride are added in small portions with cooling, initially at −10° C. Towards the end of the reaction, the temperature of the reaction mixture is 20° C. The solution becomes increasingly viscous as more isophthaloyl chloride is added. After 2 hours at room temperature, the reaction mixture is then diluted with 500 g, of dimethylacetamide and the polyamide is precipitated by pouring it into water which is vigorously agitated. After separation of the reaction product by suction filtration, it is boiled three times with water. The last wash water should not contain any chloride ions, otherwise the purification operation must be repeated. After drying at 100° C. under vacuum to constant weight, 51.1 g. (96% of the theoretical) of a yellow polyamide powder is obtained which has an inherent viscosity of 1.05 and a melting point above 500° C. The polyamide shown an absorbance A=0.47 at $$27.5 \times 10^3 \times cm.^{-1}$$

with a shoulder $A_{(sh)}=0.36$ at $26.1 \times 10^3 \times cm.^{-1}$.

A solution of 75 parts of this polyamide in 266 parts of dimethylacetamide containing 13.3 parts of lithium chloride has a viscosity of 1180 poises at 20° C. This solution can be cast to form films which have very high strength values at temperatures in the region of 400° C. after they have been dried at 100° C. and boiled with water.

Both the solution containing dimethylacetamide hydrochloride, which is formed in the course of the preparation of the polyamide, and the solution described here can be formed into filaments by the wet spinning process.

EXAMPLE 2

Polycondensation is carried out by a process analogous to that described in Example 1.

16.88 g. of N-2-(4-aminophenyl)-5-aminobenzotriazole in 151 g. of N-methylpyrrolidone which contains 7.05 g. of lithium chloride are reacted with 15.23 g. of terephthaloyl chloride. The solution, which is at first highly viscous, solidifies after about 10 minutes. The reaction mixture is taken up in 500 ml. of dimethylformamide and poured into vigorously stirred water. After suction filtration, washing and drying, 23.3 g. (87% of the theoretical) of a polyamide which has an inherent viscosity of 1.47 and a melting point above 500° C. are obtained.

The polyamide which is soluble in warm N-methylpyrrolidone if lithium chloride has been added, yields brittle films after casting, drying and washing.

EXAMPLE 3

In a manner analogous to Example 1, 16.88 g. of N-2-(4-aminophenyl)-5-aminobenzotriazole in 106.5 g. of dimethylacetamide and 2.66 g. of lithium chloride as solubilising agent are reacted with a mixture of 7.61 g. of terephthaloyl chloride and 7.62 g. of isophthaloyl chloride. The polyamide is isolated from the highly viscous solution as described in Example 1 after 2 hours. It has an inherent viscosity of 1.21. The clear films of the polyamide have good mechanical strength values at temperatures of about 350° C. The polyamide has an absorbance $A=0.47$ at $27.6\times10^3\times$ cm.$^{-1}$ with a shoulder $A_{(sh)}=0.36$ at $26.3\times10^3\times$ cm.$^{-1}$.

EXAMPLE 4

In a manner analogous to Example 1, 11.25 g. of N-2-(4-aminophenyl)-5-aminobenzotriazole and 5.40 g. of m-phenylenediamine are dissolved in 118.8 g. of dimethylacetamide with 3.60 g. of lithium chloride, and reacted with 20.3 g. of terephthaloyl chloride. The polyamide isolated by precipitation with water has an inherent viscosity of 0.98. The decomposition point of a film cast from N-methylpyrrolidone is above 400° C.

The polyamide shows an absorbance $A=0.28$ at $27.3\times10^3\times$ cm.$^{-1}$ with a shoulder $A_{(sh)}=0.19$ at $26.0\times10^3\times$ cm.$^{-1}$.

EXAMPLE 5

By the process described in Example 1, 11.25 g. of N-2-(4-aminophenyl)-5-aminobenzotriazole and 5.40 g. of m-phenylenediamine are dissolved in 118.8 g. of dimethylacetamide with 3.60 g. of lithium chloride and reacted with 20.3 g. of isophthaloyl chloride. 29.0 g. of a polyamide (98% of the theoretical) which has an inherent viscosity of 0.85 (measured in conc. sulfuric acid, 10 g./l. at 25° C.) and can be worked up into films from solution in N-methylpyrrolidone are isolated from the viscous solution by precipitation with water. The polyamide has an absorbance $A=0.29$ at $27.6\times10^3\times$ cm.$^{-1}$ and a shoulder $A_{(sh)}=0.20$ at $26.2\times10^3\times$ cm.$^{-1}$.

EXAMPLE 6

As in Example 1, 20.25 g. of N-2-(4-aminophenyl)-5-aminobenzotriazole and 1.08 g. of m-phenylenediamine are dissolved in 137.2 g. of N-methylpyrrolidone with 4.10 g. of lithium chloride, and 20.3 g. of terephthaloyl chloride are added. The product is precipitated in water after 4 hours. 33.5 g. (98% of the theoretical) of a polyamide which has an inherent viscosity of 1.58 and a decomposition point above 500° C. are obtained. In contrast to the polyamide from Example 2, this substance can be used to produce clear films which have high strength at high temperatures.

EXAMPLE 7

By the process described in Example 1, 16.88 g. of N-2-(4-aminophenyl)-5-aminobenzotriazole in 106.5 g. of N-methylpyrrolidone which contains 2.50 g. of lithium chloride are reacted with a mixture of 13.71 g. of terephthaloyl chloride and 1.52 g. of isophthaloyl chloride. 26.4 g. (99% of the theoretical) of a polyamide which has an inherent viscosity of 1.42 and a decomposition point above 500° C. are obtained. In contrast to the polyamide from Example 2, this polyamide can be worked up into clear films with high strength values.

EXAMPLE 8

As in Example 1, 11.25 g. of N-2-(3-aminophenyl)-5-aminobenzotriazole are dissolved in 71.0 g. of dimethylacetamide with 3.55 g. of lithium chloride and reacted with 10.15 g. of isophthaloyl chloride. 16.5 g. (93% of the theoretical) of a polyamide which has an inherent viscosity of 1.46 and which is soluble in N-methylpyrrolidone and can be worked up from solution into films which melt above 400° C. with decomposition are obtained.

EXAMPLE 9

In a manner analogous to Example 1, 11.25 g. of N-2-(3-aminophenyl)-5-aminobenzotriazole in 71.0 g. of dimethylacetamide are reacted with 10.15 g. of terephthaloyl chloride. 16.4 g. (93% of the theoretical) of a polyamide which has an inherent viscosity of 1.54 and a melting point above 400° C. can be isolated.

EXAMPLE 10

6.75 g. of N-2-(3-aminophenyl)-5-aminobenzotriazole are dissolved in 88.8 g. of N-methylpyrrolidone containing 4.40 g. of lithium chloride, and reacted with 7.59 g. of naphthalene-2,6-dicarboxylic acid chloride in a manner analogous to Example 1. After precipitation with water, washing and drying, 11.80 g. (97% of the theoretical) of a polyamide can be isolated which is soluble in N-methylpyrrolidone and can be worked up into clear films of high strength.

What we claim is:
1. The high molecular weight aromatic polyamide consisting essentially of recurring structural units having the formula

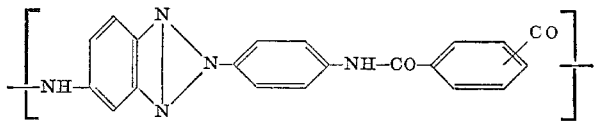

2. The high molecular weight aromatic polyamide consisting essentially of recurring structural units having the formula

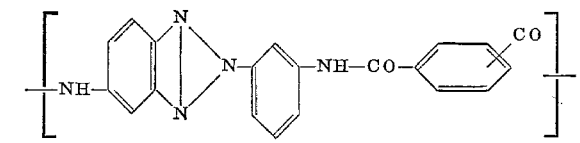

References Cited

UNITED STATES PATENTS

| | | | |
|---|---|---|---|
| 3,094,511 | 6/1963 | Hill et al. | 260—78 |
| 3,282,886 | 11/1966 | Gadecki | 260—78 |
| 3,376,268 | 4/1968 | Preston | 260—78 |

HAROLD D. ANDERSON, Primary Examiner

U.S. Cl. X.R.

260—30.2, 32.6, 47

UNITED STATES PATENT OFFICE
CERTIFICATE OF CORRECTION

Patent No. 3,575,934   Dated April 20, 1971

Inventor(s) FRIEDRICH-KARL ROSENDAHL ET AL

It is certified that error appears in the above-identified patent and that said Letters Patent are hereby corrected as shown below:

| Column | Line | Error |
|---|---|---|
| 2 | 5th formula | "-CH=C=" should be --- -CH=CH- --- |
| 2 | 6th formula | 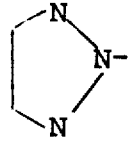 should be --- 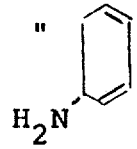 --- |
| 4 | 7th formula | "-m-benzo-bis-triazole" should be ---m-benzo-bis-triazole--- |
| 4 | 8th formula | 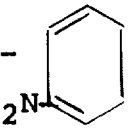 should be |
| 6 | 45 | "dimtheylacetamide" should be---dimethylacetamide--- |

Signed and sealed this 19th day of October 1971.

(SEAL)
Attest:

EDWARD M. FLETCHER, JR.          ROBERT GOTTSCHALK
Attesting Officer                Acting Commissioner of Patents